(12) United States Patent
Ramakrishnan

(10) Patent No.: US 6,990,069 B1
(45) Date of Patent: Jan. 24, 2006

(54) SYSTEM AND METHOD FOR IMPROVING TRANSPORT PROTOCOL PERFORMANCE IN COMMUNICATION NETWORKS HAVING LOSSY LINKS

(75) Inventor: Kadangode K. Ramakrishnan, Berkeley Heights, NJ (US)

(73) Assignee: AT&T Corp., New York, NY (US)

( * ) Notice: Subject to any disclaimer, the term of this patent is extended or adjusted under 35 U.S.C. 154(b) by 15 days.

(21) Appl. No.: 10/771,668

(22) Filed: Feb. 4, 2004

Related U.S. Application Data

(63) Continuation of application No. 09/215,634, filed on Dec. 15, 1998, which is a continuation of application No. 08/803,792, filed on Feb. 24, 1997, now Pat. No. 5,974,028.

(51) Int. Cl.
*H04J 1/16* (2006.01)
(52) U.S. Cl. ..................... 370/229; 370/236
(58) Field of Classification Search ................ 370/229, 370/231, 232, 233, 235, 252, 392, 394, 349, 370/465, 468, 230, 236
See application file for complete search history.

(56) References Cited

U.S. PATENT DOCUMENTS

| | | | | |
|---|---|---|---|---|
| 5,010,553 A | * | 4/1991 | Scheller et al. | 714/751 |
| 5,434,847 A | * | 7/1995 | Kou | 370/252 |
| 5,469,433 A | * | 11/1995 | McAuley | 370/474 |
| 5,764,625 A | * | 6/1998 | Bournas | 370/231 |
| 5,905,719 A | * | 5/1999 | Arnold et al. | 370/330 |
| 5,940,415 A | * | 8/1999 | Li et al. | 714/752 |
| 6,038,216 A | * | 3/2000 | Packer | 370/231 |
| 6,122,759 A | * | 9/2000 | Ayanoglu et al. | 714/57 |
| 6,128,287 A | * | 10/2000 | Freeburg et al. | 370/331 |

OTHER PUBLICATIONS

RFC 2018: TCP Selective Acknowledgement Options, Mathis et al, Oct. 1996.*
RCF 2018: TCP Selective Acknowledgement Options, Mathis et al., Oct. 1996.*

* cited by examiner

*Primary Examiner*—Andy Lee

(57) ABSTRACT

Providing transport protocol within a communication network having a lossy link. The receiver distinguishes between packets received with non-congestion bit errors and packets having been not at all received due to congestion. When packets are received with non-congestion bit errors, the receiver sends selective acknowledgments indicating that the packets were received with bit errors while suppressing duplicate acknowledgments to prevent the invocation of a congestion mechanism.

15 Claims, 7 Drawing Sheets

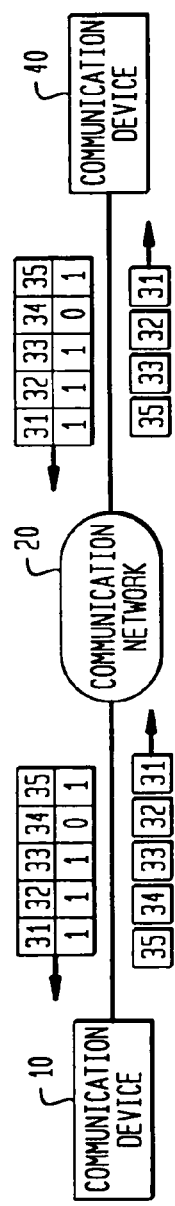
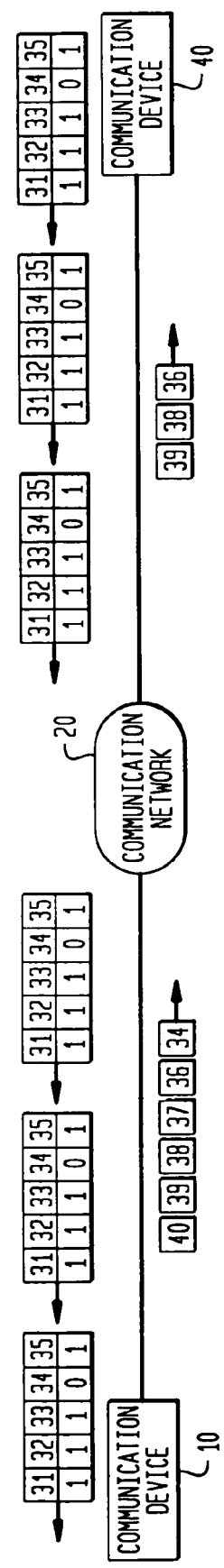
FIG. 3A
FIG. 3B

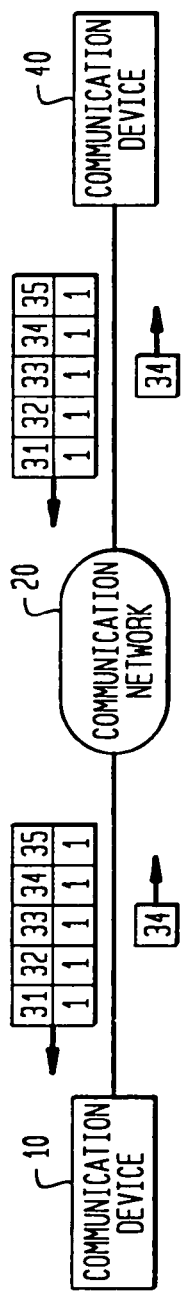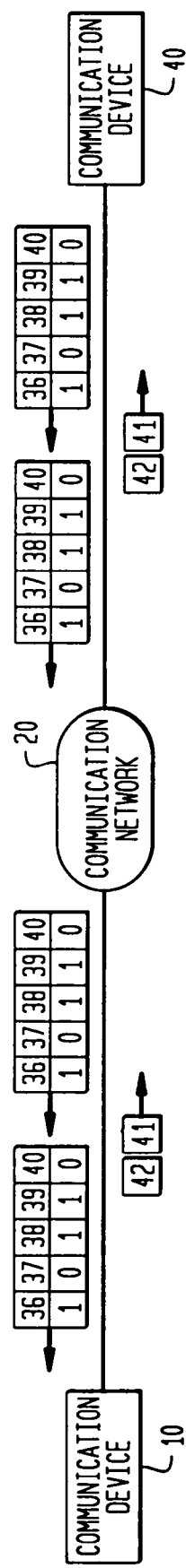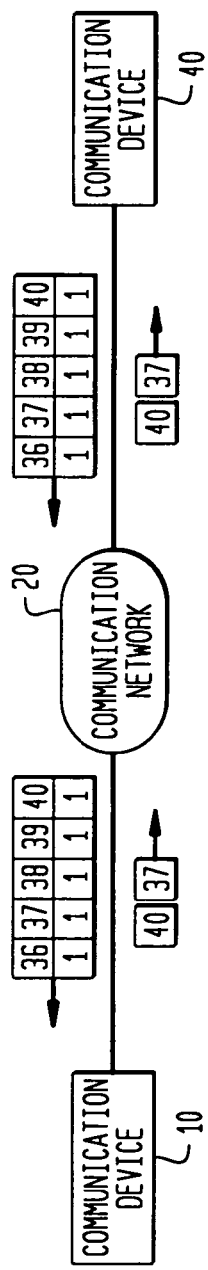

SYSTEM AND METHOD FOR IMPROVING TRANSPORT PROTOCOL PERFORMANCE IN COMMUNICATION NETWORKS HAVING LOSSY LINKS

This application is a continuation of prior application Ser. No. 09/215,634 filed Dec. 15, 1998, which is a continuation of prior application Ser. No. 08/803,792 filed Feb. 24, 1997, which issued on Oct. 26, 1999 as U.S. Pat. No. 5,974,028.

FIELD OF INVENTION

The present invention relates to a transport protocol for lossy links in communication networks. Specifically, this invention relates to improving transport protocol performance in networks having lossy links by using an erroneously received packet to trigger retransmission without invoking congestion compensation mechanisms.

BACKGROUND

Reliable transport protocols, such as the transmission control protocol (TCP), have been tuned for traditional networks comprising wired links and stationary hosts. These protocols assume congestion in the network to be the primary cause for packet losses and unusual delays. Congestion occurs when the requirements of the source(s) exceeds the transport capability of the network or the reception capability of the receiver. For example, where multiple senders transmit packets to a network switch faster than the switch's buffer can forward the packets, congestion results and some received packets are lost by the switch.

Under the TCP protocol, an acknowledgment is usually, but not necessarily, transmitted for every packet. Because the TCP protocol is a byte-stream protocol, it also has the flexibility to send an acknowledgment for a sequence of bytes. The typical acknowledgment indicates the sequence number of the last consecutive packet successfully received; this type of acknowledgment is referred to as a cumulative acknowledgment. The acknowledgment is considered cumulative because it confirms that all messages up to the indicated packet have been properly received. Every time a receiver receives a group of packets, the receiver sends an acknowledgment identifying the last continuously complete sequence of received packets. For example, consider the case where one hundred packets are sent, but packets 59 and 61–100 are not received. When the receiver successfully receives packets 1–58, it will provide an acknowledgment that all packets up to packet 58 were received; when it successfully receives packet 60 but not packet 59, the receiver will again provide an acknowledgment that up to packet 58 was received. The second acknowledgment indicates that a packet was received out of sequence without receiving the next packet in sequence. Duplicate acknowledgments can indicate to the TCP protocol that a packet was lost. Most often the packet's loss is due to congestion and some form of congestion compensation is necessary such as reducing the window size. Several schemes exist to retransmit packet(s) sequentially after recognizing that a packet was lost.

As an alternative to cumulative acknowledgments, acknowledgments can be provided which indicate which specific packets were received in error; these acknowledgments are known as selective acknowledgments (SACKs). A SACK can be embodied as a bit map, for example, where each bit of the SACK represents a packet status: "1" for a particular packet sequence number indicates the packet was received without error and "0" indicates the packet was received in error or was not received at all.

The TCP protocol avoids congestion by utilizing acknowledgments from the receiver and adjusting a sliding window for the sender. Rather than sending a packet and waiting for an acknowledgment from the receiver before sending another packet, the sender keeps track of the total number of unacknowledged packets sent and continues to transmit packets as long as the number of unacknowledged packets does not exceed a specified window size. The sender dynamically adjusts the window size by probing the communication network to determine the network's capacity. As long as there is no loss, the window size is gradually increased. When a loss occurs, the window size is reduced and then slowly expanded. The sender can identify that a packet has been lost due to congestion either by the arrival of duplicate acknowledgments indicating a loss or by the absence of an acknowledgment being received within a timeout interval. This entire process of controlling the window size to limit congestion is known as flow control.

A number of compensation schemes can be used to reduce the window size upon detection of a congestion error and to gradually increase the window size back to the edge of error free operation. Such compensation schemes include the slow-start algorithm, fast recovery, and fast-retransmit. For example, under the slow-start algorithm, if the window size was one hundred packets when a congestion error occurred, the TCP protocol reduces the window size to one; the lost packet(s) is then retransmitted and the window size is expanded after each successful subsequent transmission by the number of packets last transmitted. In other words, the slow-start algorithm reduces the window size to one and then doubles the window size after each successful transmission as indicated by the reception of an acknowledgment (ACK).

When transmitted packets fail to be received by the sender for reasons other than congestion, however, congestion compensation measures, such as reducing the window size, result in an unnecessary reduction in end-to-end throughput and suboptimal performance. For example, wireless links are increasingly being used within a communication network. Transmission errors over wireless links are often due to reasons other than congestion, such as interference. Therefore, wireless links often suffer from sporadic high bit-error rates (BERs) and intermittent connectivity problems due to handoffs. Consequently, TCP performance in networks having wireless links suffers from significant throughput degradation and very high interactive delays due to the unnecessary use of congestion compensation mechanisms.

Several approaches have been suggested to avoid performance degradation over wireless links where non-congestion errors predominate. For example, *A Comparison of Mechanisms for Improving TCP Performance Over Wireless Links*, by Hari Balakrishnan, et al., ACM SIGCOMM '96, Stanford, Calif., August 1996, discusses several. One such approach is to make the base station, which relays communication data from a source in the network to a mobile receiver, TCP aware. The base station keeps a copy of all packets forwarded to the mobile receiver until the base station is certain that the packets were received. If a packet is not received by the mobile receiver, then the mobile receiver sends to the base station the SACKs that are marked to indicate that a non-congestion related loss has occurred. Once the base station receives three duplicate marked SACKs, rather than automatically relaying these duplicate marked SACKs through the network to obtain retransmission from the source, the base station attempts to suppress the duplicate acknowledgment and retransmits a copy of the packet without invoking congestion compensation procedures. Because the base station retains copies of unacknowledged packets for multiple mobile receivers, the base station must retransmit the correct packet associated with the specific mobile receiver that failed to receive the originally transmitted packet.

The Balakrishnan scheme, however, has several shortcomings. First, in a lossy link where congestion is typically not a source of error, duplicate acknowledgments unnecessarily waste system resources and requires an unnecessary delay time until retransmission. In other words, because congestion is not the source of error and does not prohibit the first acknowledgment from being sufficient, anything more than a single acknowledgment unnecessarily taxes the system. Second, by making the base station TCP aware and requiring the base station to track the destination mobile receiver for each packet, significant buffering requirements at the base station are necessary. Furthermore, the base station must possess substantial processing capabilities to probe into the packet headers, and to classify and buffer packets according to TCP connections and process acknowledgments.

SUMMARY OF THE INVENTION

The present invention avoids sending duplicate acknowledgments and invoking a congestion mechanism when packets are received with bit errors due to the lossy link and not due to congestion. If congestion, however, is a source of error over links other than the wireless link, acknowledgments indicate that congestion is the source of error and that it would be appropriate for this system to invoke congestion mechanisms.

Additionally, the present invention is configured so that base station does not need to become TCP aware to improve TCP performance and avoid invoking congestion mechanisms when bit error is the source of errors. Thus, base station need not have the significant buffering requirements as is necessary in the prior art.

The present invention provides a transport protocol within a communication network for use by a receiver connected to the communication network by a lossy link. The receiver distinguishes between packets received with non-congestion bit errors and packets having been not at all received due to congestion.

When packets are received with non-congestion bit errors, packets are marked as having been received with a non-congestion error and then all received packets are passed to the software protocol for evaluation. The receiver sends selective acknowledgments indicating which packets were successfully received and which packets were received with non-congestion bit errors while suppressing duplicate acknowledgments to prevent the invocation of a congestion mechanism.

When packets are not received by the receiver due to congestion, acknowledgments are sent to indicate which packets were successfully received and which packets were not received at all. Duplicate acknowledgments can be sent to indicate congestion loss. Alternatively, an acknowledgment having a flag bit can be sent to indicate congestion loss.

Additionally, forward error correction bits can be added at a base station connected to the receiver over the lossy link. The added correction bits can be utilized for correct for any bit errors in the packet header to insure that a received packet has been properly delivered before any acknowledgments are constructed.

BRIEF DESCRIPTION OF THE DRAWINGS

FIGS. 3A through 3E show the transmission of information utilizing TCP protocol to invoke congestion mechanisms when packet loss is due to congestion, according to an embodiment of the present invention.

DETAILED DESCRIPTION

Figure 1:
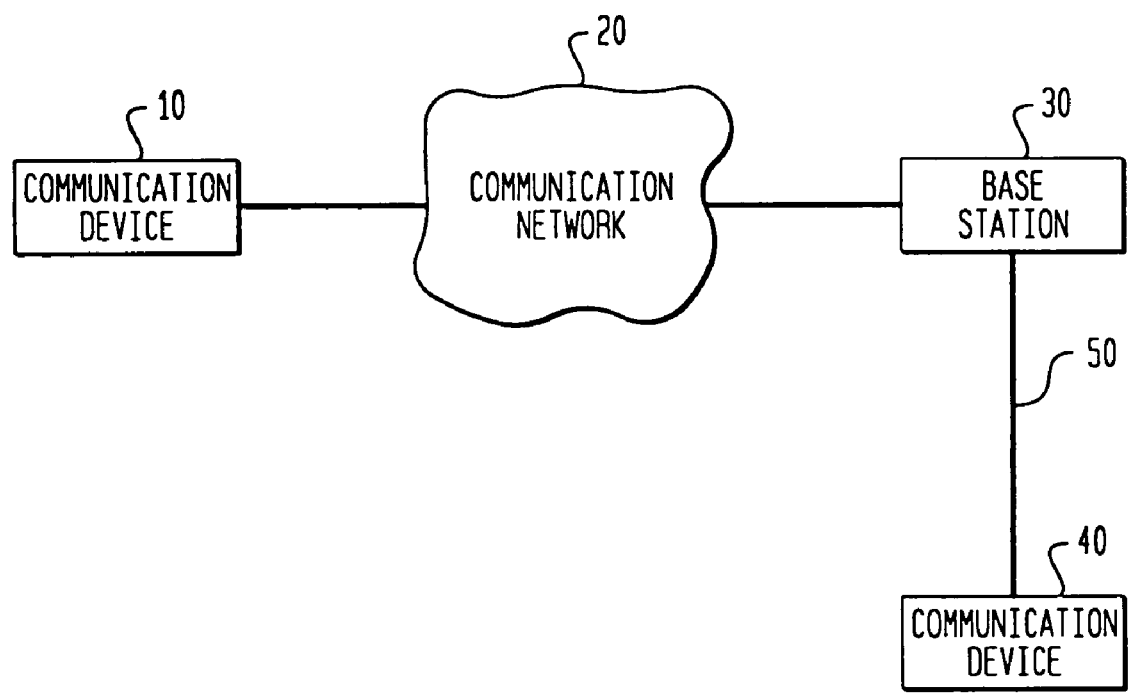
FIG. 1 illustrates a communication system according to an embodiment of the present invention.

FIG. 1 shows a communication system according to an embodiment of the present invention. Communication device 10 is connected to communication network 20, which is connected to base station 30. Base station 30 is connected to communication device 40 over a lossy link 50. Lossy link 50 is a link where transmission losses are due to primarily interference rather than congestion, such as a wireless link. Communication devices 10 and 40 transmit and receive information through communication network 20, through base station 30 and over lossy link 50. The term "information" as used herein is intended to include data, text, voice, video, etc. It should be understood that the configuration in FIG. 1 is shown for simplicity for illustration and that the actual implementation can include many more communications devices, communication networks, etc. To take advantage of the wireless link 50, communication device 40 can be a mobile receiver such as a laptop computer.

Correcting for Bit Errors Over the Lossy Link

Figure 2A:
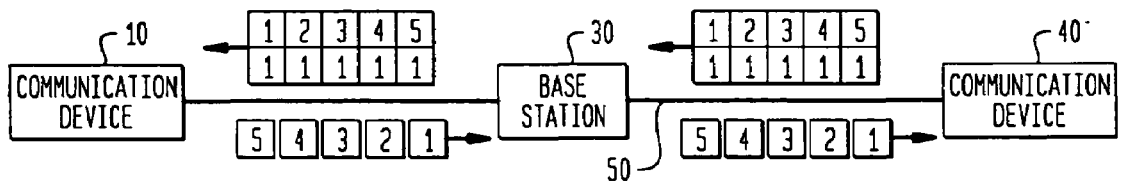
FIGS. 2A through 2E show the transmission of information utilizing TCP protocol to correct for bit errors without invoking congestion mechanisms according the present invention.

FIGS. 2A through 2E show the transmission of information utilizing the TCP protocol to correct for bit errors without invoking congestion mechanisms, according to an embodiment of the present invention. FIG. 2A shows communication device 10 transmitting packets to communication device 40 through base station 30 and over wireless link 50. For illustrative purposes, the window size shown in FIG. 2A is five packets. Thus, communication device 10 transmits five packets, sequentially numbered 1 through 5, to communication device 40 through base station 30. Once communication device 40 properly receives packets 1 through 5, communication device 40 constructs and sends a SACK indicating that all packets 1 through 5 were successfully received. Base station 30 relays that SACK to communication device 10.

The SACK constructed and sent by communication device 40 can utilize a bit map, for example, to indicate the status of each packet transmitted by communication device 10. For example, "1" can indicate a packet received without error, and "0" can indicate that the corresponding packet was not received or was received with error. Thus, the bit map forming the SACK will include a status indicator and the corresponding packet sequence number.

The timing by which communication device 40 sends SACKS can be based on a number of performance factors and/or predetermined factors. For example, the SACK can be sent once a certain number of packets have been received by communication device 40. FIG. 2A illustrates the case where the SACK is sent once communication device 40 has received five packets. Alternatively, the SACK can be sent after a timeout period, after the number of received packets equals a fraction of the congestion window, or by any combination of a timeout period and the number of packets received. The simplified scheme shown in FIGS. 2A through 2E is for illustrative purposes to more easily describe the invention; a significantly more complex timing scheme is possible.

Figure 2B:
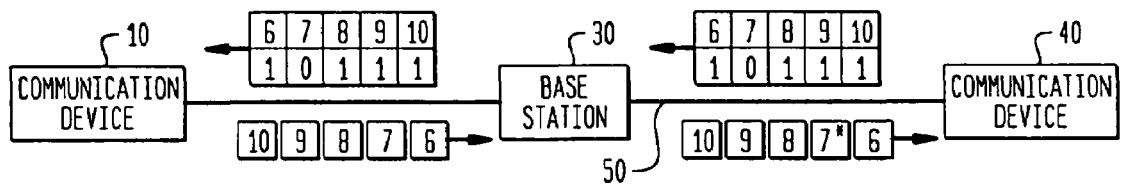

FIG. 2B shows communication device 10 transmitting the next set of packets to communication device 40. Communication device 10 sends packets 6 through 10 to base station 30 which attempts to relay those packets to communication device 40. As illustrated in FIG. 2B, packet 7 is received with bit errors due to lossy link 50. Packets received with bit errors are indicated in FIGS. 2A through 2E by the asterisk (*) with the packet sequence number. Packets 6, 8, 9 and 10 are received without bit error by communication device 40. Communication device 40 then sends a SACK having a value of "10111" corresponding to packets 6 through 10. This SACK indicates that packet 7 was received with bit error. Base station 30 receives the SACK and relays it to communication device 10. Because only one SACK is sent by communication device, rather than duplicate SACKs, communication device 10 recognizes that the loss was due to bit error and not congestion.

Figure 2C:
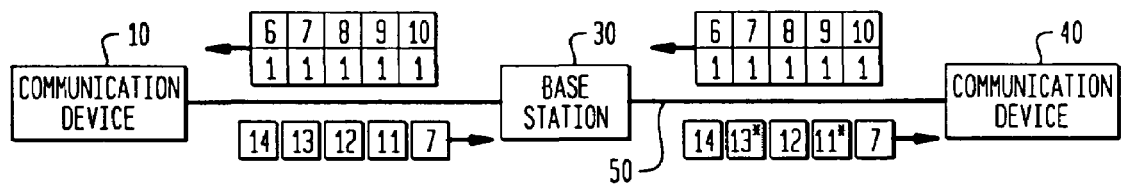

FIG. 2C illustrates the response of communication device 10 upon receiving the SACK indicating packet 7 was received with bit error. Communication device 10 retransmits packet 7, and transmits packets 11, 12, 13, and 14. Note that the window size remains set at the original size of five because the received SACK indicated bit error was the source of error for packet 7. Thus, communication device 10 leaves the window size at five when transmitting the next group of packets. Base station 30 then relays those packets 7, 11, 12, 13 and 14 to communication device 40. As illustrated in FIG. 2C, packets 11 and 13 are received with bit error and only packets 7, 12 and 14 were received without bit error by communication device 40. Communication device 40 then transmits a SACK having a value of "11111," indicating that packets 6 through 10 were received without bit error, which is then relayed by base station 30 back to communication device 10.

Note that a SACK indicating proper receipt of a retransmitted packet previously received with bit error, for example the SACK shown in FIG. 2C, is distinct from the previous SACK that indicated the receipt of a packet with bit error, for example the SACK shown in FIG. 2B. Consequently, the SACK indicating proper receipt of a retransmitted packet previously received with bit error is not treated as a duplicate SACK and, thus, no congestion mechanisms are invoked.

Figure 2D:
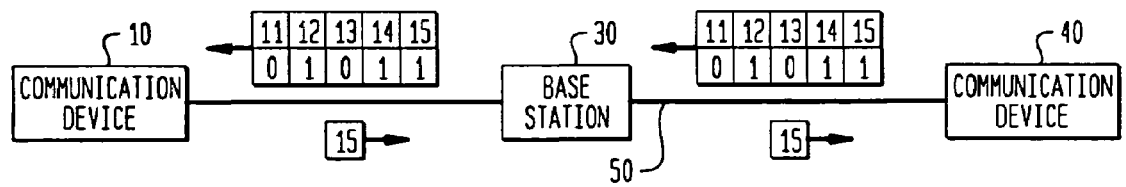

FIG. 2D illustrates the response of communication device 10 upon receiving the SACK indicating packet 7 most recently was received without bit error. Because the congestion window is set at 5 and an acknowledgment for packets 11–14 has not yet been received by communication device 10, communication device 10 sends one packet: packet 15. When communication device 40 receives packet 15 without bit error, it constructs and transmits a SACK having the value of "01011," indicating that packets 11 and 13 were received with bit error and packets 12, 14 and 15 were received without bit error.

Figure 2E:
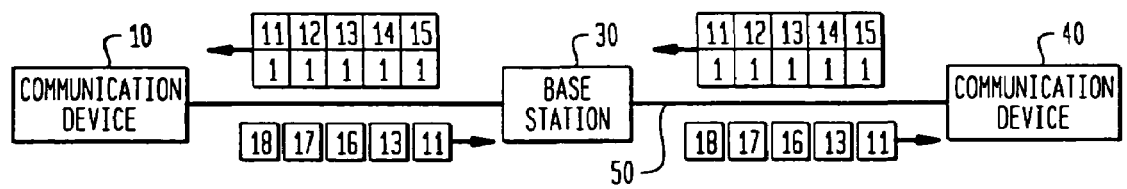

FIG. 2E illustrates the response of communication device 10 upon received the SACK. Communication device 10 retransmits packets 11 and 13, and transmits packets 16–18. Communication device 40 then constructs and sends a SACK having the value "11111," indicating that packets 11–15 were received without bit error. The process of transmitting packets and responding with SACKS is repeated. As FIGS. 2A through 2E illustrate, when packets are received with bit errors due to lossy link 50, the present invention can send SACKs indicating the requirement to retransmit those packets without invoking congestion compensation mechanisms.

Correcting for Congestion Before the Lossy Link

FIGS. 3A through 3E show the transmission of information utilizing TCP protocol where congestion mechanisms are invoked when packet loss is due to congestion, according to an embodiment of the present invention. FIG. 3A shows communication device 10 transmitting packets to communication device 40 through communication network 20, through base station 30 (not shown), and over wireless link 50 (not shown). For illustrative purposes, a SACK is sent for each group of five packets and the congestion window is set for ten packets. Communication device 10 transmits packets 31 through 35 to communication network 20. Packet 34 is lost due to congestion before reaching base station 30 and communication device 40. Note that unlike the cases illustrated in FIGS. 2A through 2E, where some packets were received having bit errors indicating a loss due to lossy link 50, here packet 34 is not received at all due to congestion. Once communication device 40 receives packets 31, 32, 33 and 35, and either a timeout period has expired or packet 35 has been received indicating the end of the window, communication device 40 constructs and sends a SACK having a value "11101" corresponding to packets 31 through 35.

FIG. 3B illustrates the response of communication device 10 upon receiving the SACK. Communication device 10 retransmits packet 34. Because five unacknowledged packets are outstanding with a congestion window of ten, communication device 10 sends packets 36 through 40 for a total of ten unacknowledged packets outstanding. FIG. 3B illustrates the case where packet 34 is again not received for a second time due to congestion; packet 37 is also not received due to congestion. It is not essential that packet 34 be lost due to congestion for a second time before a congestion mechanism in invoked; the example in FIG. 3B is for illustrative purposes. Regardless of the number of unsuccessful retransmissions for a given packet, a congestion mechanism will be invoked once communication device 10 has received at least three duplicate SACKs indicating the packet loss.

For each packet subsequently received by communication device 40 without receiving the missing packet 34 at all, communication device 40 sends a duplicate SACK indicating packet 34 was not received at all. In other words, when packet 36 is received, communication device 40 sends a duplicate SACK relating to packets 31 to 35 indicating that packet 34 was not received at all. Similarly, when packet 38 is received, communication device 40 sends a duplicate SACK indicating packet 34 was not received at all. Finally, when packet 39 is received, communication device 40 again sends an other duplicate SACK indicating packet 34 was not received.

When communication device 10 receives the second SACK indicating packet 34 was not received, communication device 10 retransmits packet 34 as shown in FIG. 3C. Once communication device 10 has received the third duplicate SACK, communication device 10 invokes a congestion mechanism. Any number of congestion mechanisms can be invoked; for simplicity of discussion, FIG. 3C illustrates the invocation of the slow-start algorithm. Initially, the congestion window is set to 1; communication device 10 does not send any packets in addition to packet 34. Upon receiving packet 34, communication device 40 sends a SACK indicating that packets 31 through 35 have been received.

Upon receiving the SACK shown in FIG. 3C indicating successful packet receipt, the congestion window is increased to two under the slow-start algorithm. As shown in FIG. 3D, communication device 10 sends packets 41 and 42 to communication device 40. Communication device 10 is as of yet unaware that packets 37 and 40 were not received by communication device 40 because communication device 10 has not received a SACK for packets 36 to 40. Upon receiving packet 41, communication device 40 sends a SACK relating to packets 36 through 40 indicating that packets 37 and 40 were not received at all. Again upon receiving packet 42, communication device 40 sends a duplicate SACK relating to packets 36 through 40 indicating that packets 37 and 40 were not received at all.

Upon receiving the SACKs regarding packets 36 through 40 shown in FIG. 3D, communication device retransmits packets 37 and 40 as shown in FIG. 3E. When communication device 40 successfully receives packets 37 and 40, it sends a SACK indicating successful receipt of packets 36 through 40. Once communication device 10 has received the SACK indicating successful receipt of packets 36 through 40, the congestion window is increased to four under the slow-start algorithm for the next transmission of packets (not shown).

As shown in FIGS. 3C and 3D, because packets 37 and 40 are successfully received and acknowledged by communication device 40 before communication device 10 received three duplicate SACKs, the slow-start congestion mechanism is not invoked. It is not always the case that packets lost to congestion can be successfully retransmitted before the invocation of a congestion mechanism. For example, in a case where packet 43 had been transmitted and a corresponding third SACK was generated (indicating packets 37 and 40 were not received) before packets 37 and 40 were retransmitted and successfully acknowledged, communication device 10 would have invoked a congestion mechanism. Similarly, in a case where the time out period had expired at communication device 40 before packets 37 and 40 were retransmitted and successfully acknowledged, a third SACK (indicating packets 37 and 40 were not received) was generated, communication device 10 would have invoked a congestion mechanism. The specific example shown in FIGS. 3C and 3D is for illustrative purposes; other cases are also possible.

Although FIGS. 2 and 3 individually illustrate the cases where packet loss is due to bit error over the lossy link and due to congestion, respectively, the present invention applies equally where types of losses occur simultaneously.

In an alternative embodiment of the present invention, a flag bit can be included with the SACK. The flag bit can have a value of "1" to indicate all packets were received free of bit errors or indicate some packets were not received at all due to congestion. The flag bit have a value of "0" to indicate at least one packet was received with bit error. Communication device 10 can be configured to recognize the flag bit and determine the state of the received packets. If the flag bit has a value of "0" then communication device 10 knows that the packets having a value of "0" in the SACK bit map were received in error by communication device 40 and a congestion mechanism should not be invoked. If the flag bit has a value of "1" and at least one bit in the SACK bit map has a value of "0" then communication device 10 knows that at least one packet was not received by communication device 40 due to congestion and therefore a congestion mechanism should be invoked. In this case, the flag bit sufficiently indicates congestion; the flag bit can be combined with duplicate SACKs discussed above in connection with FIGS. 2 and 3 or can be employed alone with duplicate SACKS. If the flag bit has a value of "1" and all the bits in the SACK bit map have a value of "1" then communication device 10 knows all the packets were successfully received by communication device 40.

Forward Error Correction (FEC) at the Base Station

The present invention can utilize known forward error correction (FEC) techniques to further improve TCP performance. FEC techniques include inserting forward error correction bits within a train of data bits to provide error correction capabilities. For example, for every two bits of data, a forward error correction bit can be added. If an error occurs to either of the two data bits, the forward error correction bit can be used to recover the lost data. Typically, forward error correction bits are added for the entire packet including the packet header and the packet payload. For example, a packet with a 40 bit header and a 1500 bit payload could utilize FEC techniques by adding another 20 forward error correction bits for the header and another 500 forward error correction bits for the payload.

In the present invention, rather than adding forward error correction bits to the entire packet, forward error correction bits are added to just the packet header. Adding forward error correction capability to the header improves the likelihood that the correct address can be accurately identified, thereby preventing wrongly addressed packets from being incorrectly delivered and from generating incorrect SACKs. Adding forward error correction bits to only the header keeps the associated overhead costs small while providing forward error correction capability where it can be most effectively utilized. Thus, providing forward error correction capability for the packet header makes the present invention more robust.

Figure 4:
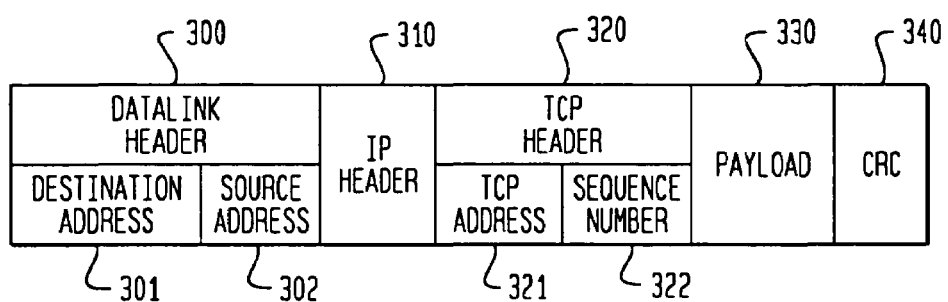
FIG. 4 shows a typical packet format of the prior art.

FIG. 4 shows a typical packet format of the prior art. Each packet has datalink header 300 including destination address 301 and source address 302, IP header 310, TCP header 320 including TCP address 321 and sequence number 322, payload 330 and CRC 340. CRC 340 represents the cyclic redundancy check (CRC) quantity transmitted along with the packet to enable the receiving communication device to detect data corruption. The value of CRC 340 is computed by treating bit strings as polynomials with binary coefficients. In a routed environment, where the packets are transported between routers (not shown) within communication network 20, each packet is given a new datalink layer address 300. Base station 30 can also perform routing functions so that each packet received at base station 30 is also given a new datalink layer address 300. Whenever each packet is given a new datalink layer address 300, the value for CRC 340 of each packet is also recalculated.

Figure 5:
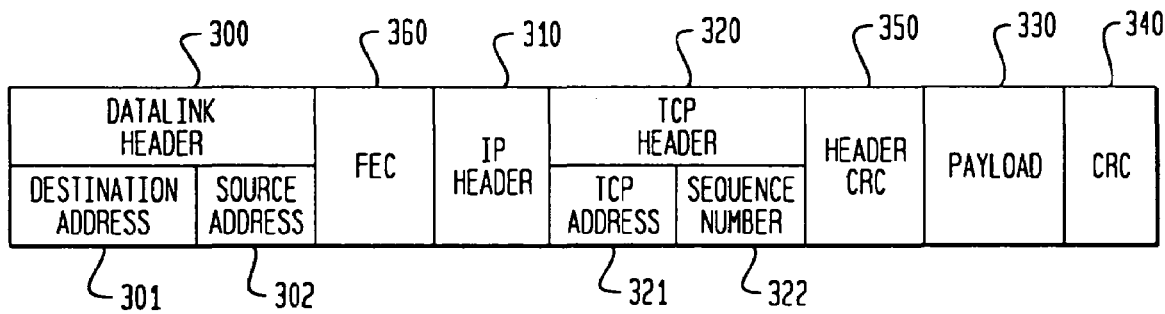
FIG. 5 shows the format of a packet with forward error correction (FEC) according to an embodiment of the present invention.

The forward error correction bits are added at any point where the cyclic redundancy check is generated. FIG. 5 shows the format of a packet with FEC according to an embodiment of the present invention. Each packet has header CRC 350 and FEC 360. Header CRC 350 provides error detection for IP header 310 and TCP header 320 in the same manner described above in reference to CRC 340. FEC 360 provides forward error correcting capability for IP header 310 and TCP header 320. FEC 360 includes redundant bits from IP header 310 and TCP header 320; for example, FEC 360 can include one redundant bit for every ten bits in IP header 310 and TCP header 320. When header CRC 350 indicates a bit error has occurred in IP header 310 and/or TCP header 320, the lost header information can be recovered from FEC 360, thereby, reconstructing the IP header 310 and/or TCP header 320. The forward error correction bits can be added, for example, at base station 30 directly before the information is sent over lossy link 50. By adding the forward error correction bits at base station 30, communication network 20 is not burdened with transporting the extra forward error correction bits. Furthermore, base station 30 may be the only router aware that communication device 40 is connected over lossy link 50 and is, therefore, susceptible to bit errors.

Alternatively, the forward error correction bits can be added at communication device 10 or at any intermediate router (not shown) within communication network 20. Communication device 10 and any intermediate router, however, are generally unaware that communication device 40 is connected to communication network 20 over a lossy link. Consequently, adding the FEC bits at communication device 10 or any intermediate router requires that they be aware of the complete route to know when the addition of FEC bits are required.

Packet Error Checking and SACK Construction

Figure 6:
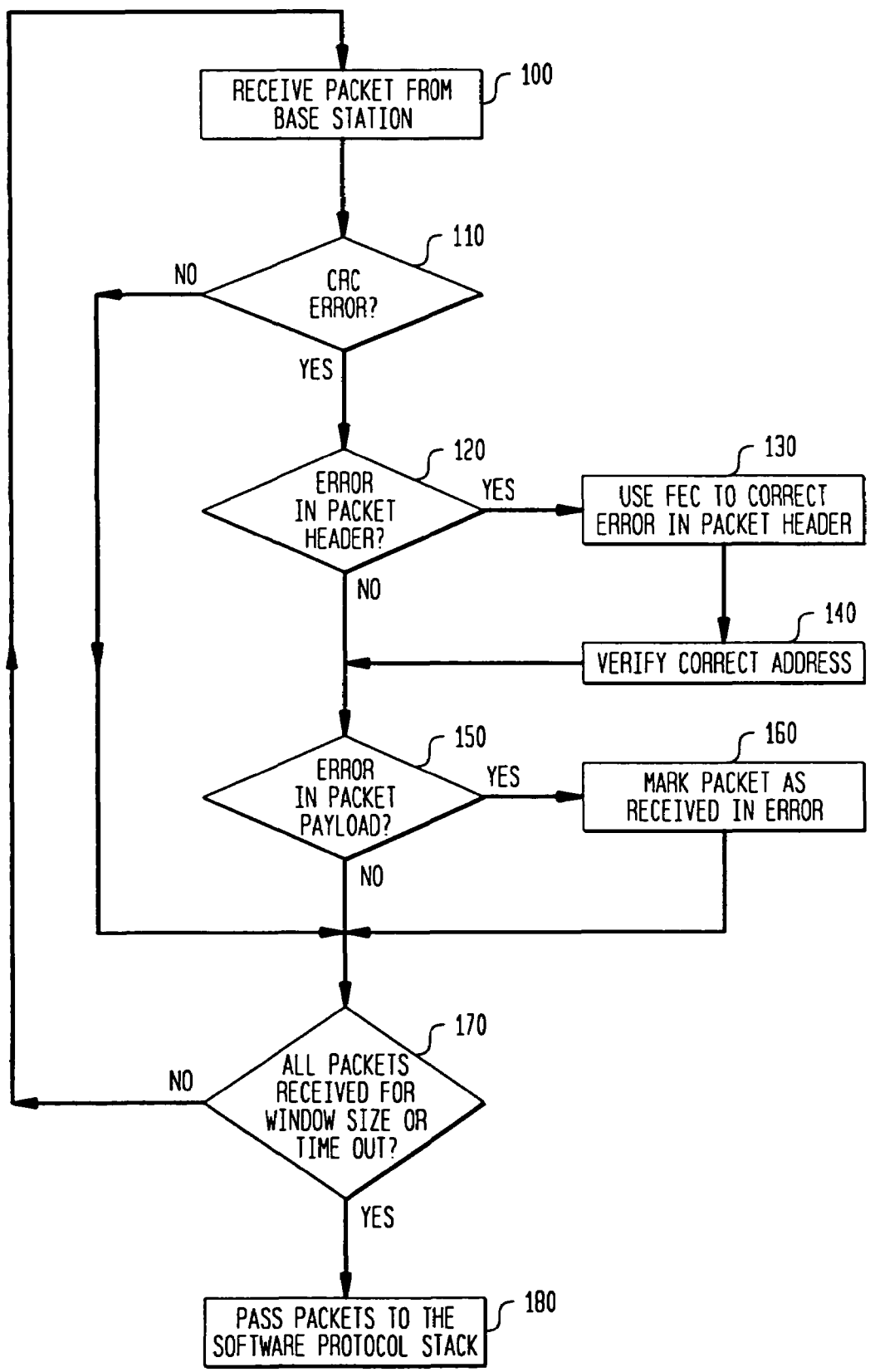
FIG. 6 shows the process for error checking received packets according to an embodiment of the present invention.

FIG. 6 shows the process for error checking received packets according to an embodiment of the present invention. The process illustrated by FIG. 6 can be performed by software or hardware, such as a network adapter (not shown). The process starts at step 100 in which a packet is received by communication device 40 from base station 30. The process proceeds to conditional step 110 where the packet is checked for an error by evaluating CRC 340. If the packet is error free, the process proceeds to conditional step 170. If the packet has a CRC error, the process proceeds to conditional step 120 which tests whether the error is in the packet header by evaluating header CRC 350. If the error is not in the packet header, then the process proceeds to conditional step 150. If the error is in the packet header, then the process proceeds to step 130 where known FEC techniques use FEC 360 to correct the error in the packet header. The process then proceeds to step 140 where the address of the packet is correct for communication device 40. If the packet is not correct for communication device 40, then it is flushed. Once the packet is verified as correct for communication device 140, the process proceeds to conditional step 150.

Conditional step 150 tests whether the error is in payload 330 of the packet. If the error is not in packet payload 330, then the process proceeds to conditional step 170. If the error is in the packet payload 330, then the process proceeds to step 160 where the packet is marked as having been received in error. The process then proceeds to conditional step 170.

Conditional step 170 tests whether all the packets for the window size have been received or the time out period has expired. If more packets are expected and the time out period has not expired, then the process returns to step 100. If no more packets are expected or the time out period has expired then the process proceeds to step 180 where the received packets, including packets received with bit errors in the payload, are passed to the software protocol stack (not shown).

Figure 7:
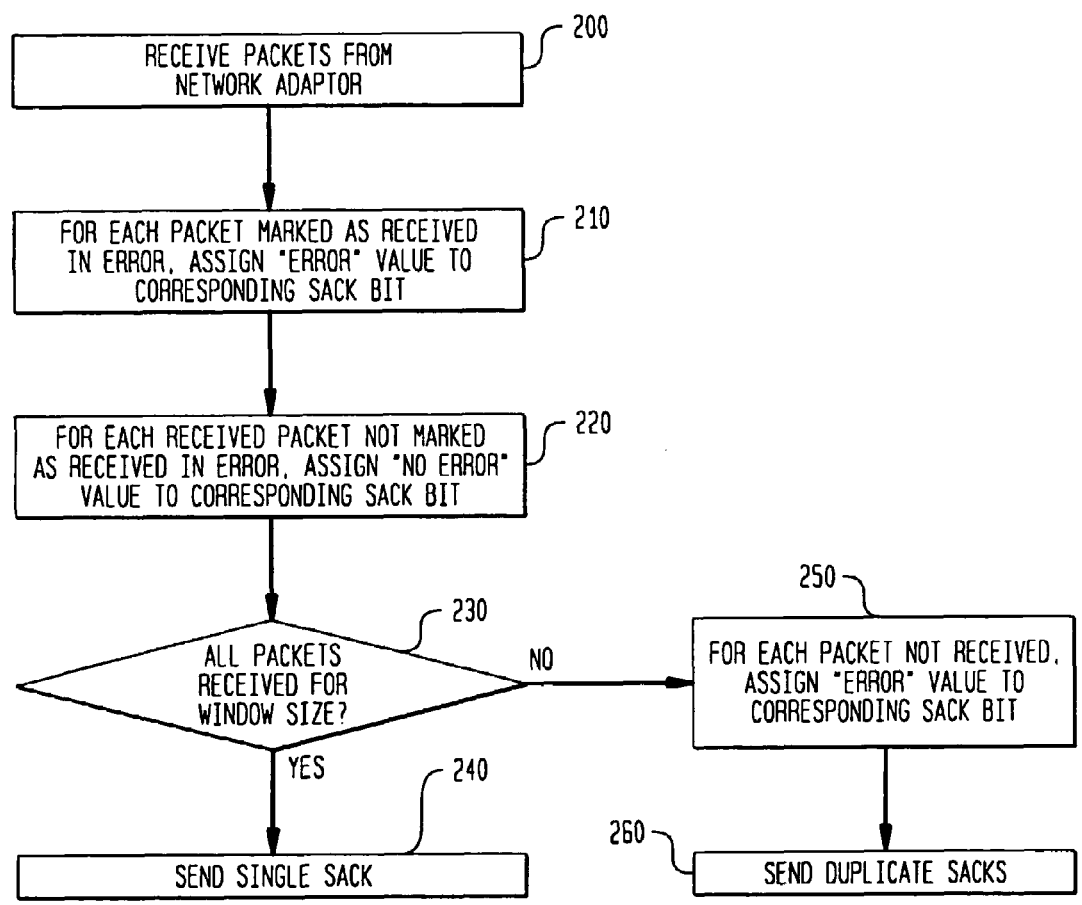
FIG. 7 shows the process to build and transmit a selective acknowledgment according to an embodiment of the present invention.

FIG. 7 shows the process to build and transmit a SACK performed by the software protocol stack, according to an embodiment of the present invention. The process begins at step 200 where the packets are received from the network adapter the process for which is described in FIG. 6. The process then proceeds to step 210 where, for each packet marked as received in error in step 160, an "error" value (e.g., "0") is assigned to the SACK bit corresponding to that packet. The process then proceeds to step 220 where, for each packet not marked as received in error in step 160, a "no error" value (e.g., "1") is to the SACK bit corresponding to that packet. The process then proceeds to conditional step 230.

Conditional step 230 tests whether all packets were received for the window size. If all packets for the window size were received, then the process proceeds to step 240 where the SACK constructed in steps 210 and 220 is sent. If all packets for the window size were not received, then the process proceeds to step 250 where, for each packet not received, an "error" value (e.g., "0") is assigned to the corresponding SACK bit. The process then proceeds to step 260 where duplicates of the SACK constructed in steps 210 and 220 are sent. Because duplicate SACKs are sent, congestion mechanisms are invoked by communication device 10.

Alternative processes for error checking and SACK construction are possible. For example, under a transport protocol other than TCP, such as OSI TP4 (Open Systems Interconnection, transport protocol class 4), congestion can be controlled at the receiver rather than the sender. In other words, under OSI TP4, congestion can be controlled by communication device 40 rather than communication device 10. In such a case, duplicate SACKs would not be necessary because communication device 40 controls the invocation of a congestion mechanism. When a packet is received with a non-congestion error, the network adapter can pass the packet to the software protocol without invoking a congestion mechanism. When a packet is not received due to congestion, it is interpreted as a congestion loss and a congestion mechanism can be invoked to reduce the window size.

It should, of course, be understood that while the present invention has been described in reference to particular system configurations, other system configurations should be apparent to those of ordinary skill in the art. For example, the present invention can operate on any type of communication network or combination or networks that utilize a transport protocol, such a voice network like the public switched telephone network (PSTN), or a data network like the Internet. The present invention is applicable for various protocols including TCP and OSI TP4. Similarly, although the present invention has been described in reference to the transmission of packets, the present invention also relates to the transmission of bits.

What is claimed is:

1. A method for improving transmission control protocol (TCP) performance of a communication network wherein a receiver receives a plurality of packets each having a header comprising an address and a sequence number, said method comprising the steps of:

identifying at least one received packet having a bit error; and if all packets for a window size are received, sending a selective acknowledgement indicating that said at least one received packet has a bit error and suppressing duplicate acknowledgements.

2. The method of claim 1, further comprising the step of: constructing the selective acknowledgment having a plurality of acknowledgment bits, each acknowledgment bit corresponding to a respective packets for said window size.

3. The method of claim 2, wherein said constructing step further comprises the steps of:

for each of said at least one identified packets having a bit error, assigning an error value to a corresponding acknowledgment bit in said selective acknowledgment; and for each of said received packets for the window size not having a bit error, assigning a no-error value to a corresponding acknowledgement bit in said selective acknowledgment.

4. The method of claim 3 wherein said constructing step further comprises the step of:

for each packet for the window size not received, assigning an error value to a corresponding acknowledgment bit in said selective acknowledgment.

5. The method of claim 1 further comprising the step of: sending duplicate selective acknowledgments if all packets for a window size are not received.

6. A method for providing transport protocol within a communication network having a receiver receiving a plurality of packets, said method comprising:

determining a non-congestion bit error for at least one packet from the plurality of packets; and sending a selective acknowledgment associated with said at least one packet having a non-congestion bit error without invoking a congestion control mechanism.

7. The method of claim 6, further comprising the steps of: determining a congestion bit error for at least a second packet from the plurality of packets; and sending a plurality of duplicate acknowledgments associated with said second packet having a congestion bit error.

8. The method of claim 7, further comprising the step of invoking a congestion control mechanism.

9. The method of claim 6 wherein said selective acknowledgment comprises a plurality of bits indicating a status of an associated plurality of packets.

10. The method of claim 9 wherein each of said plurality of bits corresponds to a sequence number of a packet from the plurality of packets, each bit having one value from the group of a first value indicating a packet was received with an error or a packet was not received, and a second value indicating a packet was received without an error.

11. A program storage device readable by a machine, tangibly embodying a program of executable program instructions to perform a method for improving transmission control protocol (TCP) performance of a communication network wherein a receiver receiving a plurality of packets each having a header comprising an address and a sequence number, said method comprising the steps of:

identifying at least one received packet having a bit error; and if all packets for a window size are received, sending a selective acknowledgement indicating that said at least one received packet has a bit error and suppressing duplicate acknowledgments.

12. A program storage device readable by a machine, tangibly embodying a program of executable instructions to perform a method for providing transport protocol within a communication network having a receiver receiving a plurality of packets, said method comprising:

determining a non-congestion bit error, for at least one packet from the plurality of packets; and sending a selective acknowledgement associated said at least one packet having a non-congestion bit error without invoking a congestion control mechanism.

13. A method for improving transmission control protocol (TCP) performance of a communication network comprising the steps of:

transmitting a plurality of packets to a receiver; and receiving a selective acknowledgement associated with at least one packet having a non-congestion bit error and not invoking a congestion control mechanism.

14. The method of claim 13 wherein said selective acknowledgment comprises a plurality of bits indicating a status of an associated plurality of packets.

15. The method of claim 14 wherein each of said plurality of bits corresponds to a sequence number of a packet from the plurality of packets, each bit having one value from the group of a first value indicating a packet was received with an error or a packet was not received, and a second value indicating a packet was received without an error.

* * * * *